United States Patent [19]

Koyama et al.

[11] Patent Number: 5,757,806
[45] Date of Patent: May 26, 1998

[54] DATA MULTIPLEXING SYSTEM HAVING AT LEAST ONE LOW-SPEED INTERFACE CIRCUIT CONNECTED TO A BUS

[75] Inventors: Hiroki Koyama; Yoshihiro Ashi; Hiroyuki Fujita; Michael A. Wright, all of Yokohama, Japan

[73] Assignee: Hitachi, Ltd., Tokyo, Japan

[21] Appl. No.: 846,165

[22] Filed: Apr. 28, 1997

Related U.S. Application Data

[63] Continuation of Ser. No. 499,506, Jul. 7, 1995, abandoned, which is a continuation of Ser. No. 326,236, Oct. 20, 1994, Pat. No. 5,452,307.

[30] Foreign Application Priority Data

Oct. 20, 1993 [JP] Japan ................. 5-262617

[51] Int. Cl.$^6$ ............................................. H04J 3/22
[52] U.S. Cl. ................ 370/535; 370/376; 370/498; 370/538; 370/543
[58] Field of Search .................................. 370/362, 364, 370/365, 375, 376, 458, 498, 535, 537, 538, 359, 542, 543

[56] References Cited

U.S. PATENT DOCUMENTS

| | | | |
|---|---|---|---|
| 4,697,262 | 9/1987 | Segal et al. | 370/84 |
| 4,979,166 | 12/1990 | Yamada | 370/84 |
| 5,079,769 | 1/1992 | Ehkicke et al. | 370/112 |
| 5,136,587 | 8/1992 | Obana et al. | 370/112 |
| 5,251,261 | 10/1993 | Parrucle | 370/112 |
| 5,257,261 | 10/1993 | Parruck et al. | 370/84 |
| 5,265,095 | 11/1993 | Fiedler et al. | 370/112 |

FOREIGN PATENT DOCUMENTS

| | | |
|---|---|---|
| 60-239142 | 11/1985 | Japan. |
| 62-39928 | 2/1987 | Japan. |
| 3-240334 | 10/1991 | Japan. |

OTHER PUBLICATIONS

Teranishi et al., "Design of Transmission Facilities of Digital Network," published by the Association of Telecommunication on Aug. 10, 1984, Fig. 4.17, p. 157.

Primary Examiner—Hassan Kizou
Attorney, Agent, or Firm—Antonelli, Terry, Stout & Kraus, LLP

[57] ABSTRACT

A data multiplexing system which includes a plurality of data multiplexing buses through which a plurality of low-speed digital signals are collected into, and distributed from, a multiplexer/demultiplxer. In a data multiplexing mode, the low-speed digital signals entered from a plurality of low-speed transmission lines have their signal format converted by respectively corresponding low-speed interface circuits, and the resulting signals are multiplexed in time slots designated within a multiplexed signal of primary level on the up bus line of the corresponding data multiplexing bus. The high-speed multiplexer multiplexes the collected signals up to a predetermined signal level and sends the resulting secondary multiplexed signal to a high-speed interface module having a high-speed transmission line interface. The high-speed interface module converts the received secondary multiplexed signal and sends the resulting signal to the high-speed transmission line. The signal of the high-speed transmission line is processed by the high-speed interface module and the high-speed demultiplexer, and the low-speed digital signals are sent to the low-speed transmission lines.

3 Claims, 16 Drawing Sheets

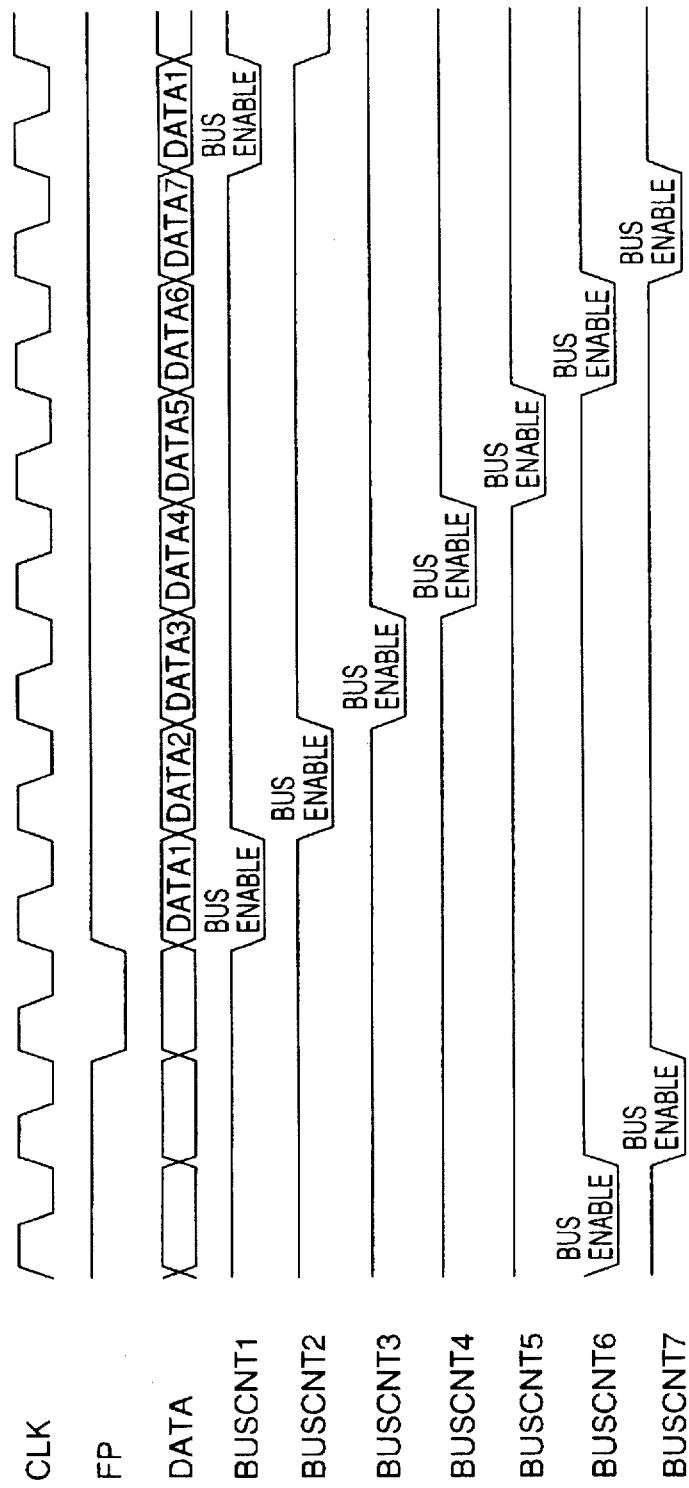

DATA MULTIPLEXING SYSTEM HAVING AT LEAST ONE LOW-SPEED INTERFACE CIRCUIT CONNECTED TO A BUS

This application is a continuation of application Ser. No. 08/499,506, filed on Jul. 7, 1995, now abandoned; which is a continuation of application Ser. No. 08/326,236, filed Oct. 20, 1994, now U.S. Pat. No. 5,452,307.

BACKGROUND OF THE INVENTION

1. Field of the Invention

The present invention relates to a data multiplexing system which multiplexes and demultiplexes digital signals between a plurality of low-speed transmission lines and a high-speed transmission line in a digital communication network.

2. Description of the Related Art

A technique stated in, for example, "Teranishi and Kitamura: Design of Transmission Facilities of Digital Network (published by the Association of Telecommunication)" has been known as regards a data multiplexing system in the prior art for multiplexing and demultiplexing digital signals between a plurality of low-speed transmission lines and a high-speed transmission line in a digital communication network.

FIG. 15 of the accompanying drawings illustrates the architecture of such a prior-art data multiplexing system.

As shown in the figure, the data multiplexing system 40 is constructed of low-speed interface modules 43 each of which collects low-speed transmission lines 41 and converts them into signals (synchronized signals) suitable for data multiplexing (and also converts such synchronized signals into digital signals), a multiplexer/demultiplexer 44 which collects the signals (synchronized signals) sent from the low-speed interface modules 43 and multiplexes them (and also demultiplexes a multiple signal into such synchronized signals), and a high-speed interface module 45 which is connected with the multiplexer/demultiplexer 44 so as to interface with a high-speed transmission line 42.

Herein, as depicted in the figure, the multiplexer/demultiplexer 44 exchanges the signals with the individual low-speed interface modules 43 through separate signal lines.

Referring also to FIG. 16, the low-speed digital signals via the low-speed transmission lines 41 (input signals A, B and C) having entered the data multiplexing system 40 are all synchronized to a reference phase included in the system 40, by the respectively corresponding low-speed interface modules 43. Thereafter, the synchronized signals A, B and C are respectively sent to the multiplexer/demultiplexer 44. In the multiplexer/demultiplexer 44, the synchronized signals A to C sent from the low-speed interface modules 43 are read out sequentially in accordance with a clock synchronous with the high-speed transmission line 42. Thus, the plurality of low-speed digital signals are finally multiplexed into the multiple signal N, which is sent to the high-speed transmission line 42 through the high-speed interface module 45.

On the contrary, the high-speed digital signal (multiple signal) having entered the data multiplexing system 40 from the high-speed transmission line 42 is demultiplexed by the multiplexer/demultiplexer 44, and the resulting signals are sent from the low-speed interface modules 43 to respectively corresponding low-speed transmission lines 41.

As stated above, in the prior-art data multiplexing system 40, the multiplexer/demultiplexer 44 exchanges the signals individually with the respective low-speed interface modules 43.

According to such a scheme, however, the nodes of the respective low-speed interface modules 43 with the multiplexer/demultiplexer 44 in the data multiplexing system 40 need to be separately formed.

Therefore, the data multiplexing system 40 has tended to become large in size. Another problem has been that the relationships between the multiplexer/demultiplexer 44 and the individual low-speed interface modules 43 are sometimes determined to a certain degree by the separately formed nodes, so flexible data multiplexing and demultiplexing are difficult.

SUMMARY OF THE INVENTION

In view of the problems of the prior art, the present invention has for its object to provide a data multiplexing system which has a scheme adapted for a smaller size and which is capable of data multiplexing and demultiplexing of higher flexibility.

In order to accomplish the object, the present invention provides a data multiplexing system which is connected to a plurality of low-speed transmission lines for transmitting digital signals, and a high-speed transmission line for transmitting a digital signal frame of nth rate level and which performs data multiplexing and demultiplexing between the plurality of digital signals which are transmitted by the connected low-speed transmission lines, and the digital signal frame of the nth rate level which is transmitted by the connected high-speed transmission line; comprising:

a plurality of low-speed interface circuits in each of which the corresponding low-speed transmission line is connected;

a plurality of data multiplexing buses each of which transmits a digital signal frame of kth (k<n) rate level, and to each of which at least one of the plurality of low-speed interface circuits is connected;

a multiplexer/demultiplexer in which the plurality of data multiplexing buses, and a high-speed signal line for transmitting the digital signal frame of the nth rate level are connected so as to perform data multiplexing and demultiplexing between the plurality of digital signal frames of the kth rate level that are transmitted by the connected data multiplexing buses, and the digital signal frame of the nth rate level that is transmitted by the connected high-speed signal line;

a high-speed interface circuit which supplies the digital signal frame of the nth rate level to and from the high-speed transmission line in the data multiplexing and demultiplexing, respectively; and allocation means for allocating to the respective low-speed interface circuits, time slots of the digital signal frames of the kth rate level on the data multiplexing buses to which the corresponding low-speed interface circuits are connected;

wherein the plurality of low-speed interface circuits operate in the data multiplexing to send digital signal frames of mth (m≦k) rate level containing the digital signals transmitted by the connected low-speed transmission lines, in the time slots allocated to the corresponding low-speed interface circuits within the digital signal frames of the kth rate level on the data multiplexing buses to which the corresponding low-speed interface circuits are connected, while they operate in the data demultiplexing to derive digital signal frames of the mth rate level in the time slots allocated to the corresponding low-speed interface circuits within the digital signal frames of the kth rate level on the data multiplexing buses to which the corresponding low-speed interface circuits are connected, and to send on the connected low-speed transmission lines the digital signals contained in the derived digital signal frames of the mth rate level.

In accordance with the data multiplexing system of the present invention, the plurality of low-speed interface circuits are connected by the bus connection based on the data multiplexing buses, and the respective low-speed interface circuits are connected with the multiplexer/demultiplexer by employing those time slots on the data multiplexing buses which can be allocated to the individual low-speed interface circuits as desired.

Therefore, the system can be made small in size. Moreover, regarding the mounting of the low-speed interface circuits, restrictions are relieved, and data multiplexing/ demultiplexing of higher flexibility can be performed.

BRIEF DESCRIPTION OF THE DRAWINGS

FIG. 2 is a timing chart showing an example of the operation of the data multiplexing system of the first embodiment;

DESCRIPTION OF THE PREFERRED EMBODIMENTS

Embodiments of data multiplexing systems according to the present invention will be described below by taking the applications thereof to the SONET (Synchronous Optical NETwork) as examples.

Here, the SONET is one practicable example of the B-ISDN (Broadband aspects of Integrated Services Digital Network) proposed by Bellcore (BELL COmmunications REsearch Inc.) in the U.S.A.

Now, the first embodiment of the data multiplexing system according to the present invention will be described.

Figure 1:
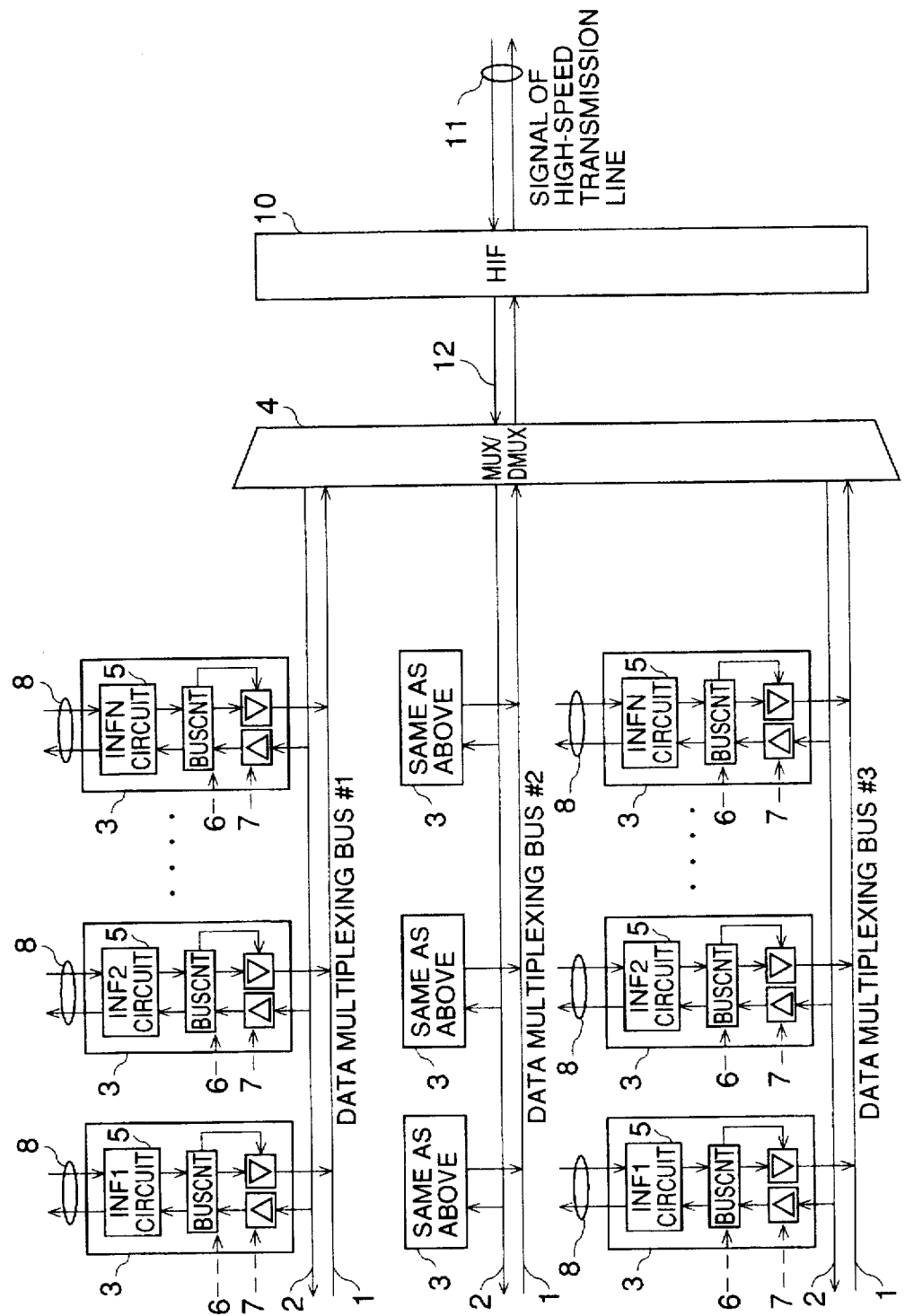
FIG. 1 is a block diagram showing the architecture of a data multiplexing system according to the first embodiment of the present invention.

FIG. 1 illustrates the architecture of the data multiplexing system of the first embodiment.

Referring to the figure, numerals 8 indicate low-speed transmission lines, and numeral 11 indicates a high-speed transmission line. The data multiplexing system comprises data multiplexing buses #1, #2 and #3 each being configured of bus lines 1 and 2 each of which sends a primary multiplexed signal obtained by multiplexing the signals of the low-speed transmission lines 8. It also comprises a high-speed signal line 12 which sends a secondary multiplexed signal obtained by further multiplexing the primary multiplexed signals.

In addition, the system comprises low-speed interface circuit boards 3 in which the different sorts of low-speed digital transmission lines 8 are connected. It also comprises a high-speed multiplexer/demultiplexer 4 which performs the data multiplexing and demultiplexing between the primary multiplexed signals on the bus lines 1, 2 of the data multiplexing buses #1–#3 and the secondary multiplexed signal on the high-speed signal line 12. A high-speed interface module 10 is also comprised for controlling the interface between the high-speed transmission line 11 and the high-speed signal line 12.

Each of the low-speed interface circuit boards 3 includes a low-speed interface circuit 5 for the interface of the pertinent circuit board 3 with the corresponding low-speed side transmission line 8. It also includes a bus control circuit 6 which performs the controls of delivering a low-speed digital signal received from the low-speed side transmission line 8, in an allocated time slot within the primary multiplexed signal on the up bus line 1 of the corresponding data multiplexing bus #1, #2 or #3, and accepting a digital signal to be sent to the low-speed side transmission line 8, the digital signal being existent in an allocated time slot within the primary multiplexed signal on the down bus line 2 of the data multiplexing bus #1, #2 or #3. A buffer circuit 7 for the digital signals is also included in order to interface the circuit board 3 with the bus lines 1 and 2. The low-speed interface circuit 5 also serves for the rate or speed conversion and format conversion between the signal on the low-speed side transmission line 8 and the signal on the bus line 1 or 2. By the way, the digital signals are multiplexed on each of the bus lines 1 and 2 in units of frames in a predetermined format. This will be elucidated later.

In the data multiplexing mode (transmission mode) of the data multiplexing system shown in FIG. 1, the low-speed digital signals having entered from the low-speed side transmission lines 8 have their signal format converted by the low speed side interface circuits 5, respectively. The resulting signals are respectively multiplexed in the designated time slots within the primary multiplexed signal on the up bus line 1 of the data multiplexing bus, under the controls of the bus control circuits 6. The high-speed multiplexer 4 collects the primary multiplexed signals on the plurality of up bus lines 1, and further multiplexes the collected signals up to a predetermined signal level. It sends the resulting signal as the secondary multiplexed signal to the high-speed interface module 10 which includes a high-speed transmission line interface. The high-speed interface module 10 receives the secondary multiplexed signal from the high-speed multiplexer 4, and converts the received signal so as to match the interface of the high-speed transmission line 11. The resulting signal is transmitted as a high-speed transmission line signal.

To the contrary, in the data demultiplexing mode (reception mode) of the data multiplexing system, the high-speed transmission line signal having entered the system from the transmission line 11 is received by the high-speed interface module 10. After the received signal has had its signal format converted reversely to the signal format conversion in the transmission mode, the resulting signal is sent to the high-speed demultiplexer 4 as the secondary multiplexed signal. The high-speed demultiplexer 4 demultiplexes the secondary multiplexed signal into the plurality of primary multiplexed signals, which are respectively sent to the predetermined down bus lines 2. The low-speed interface circuit boards 3 accept the signals of the designated time slots on the corresponding down bus 2. They convert the accepted signals into the digital signals matched with the corresponding low-speed side transmission lines 8 by means of the low-speed interface circuits 5. The resulting signals are respectively sent to the low-speed side transmission lines 8 as the low-speed digital signals.

Here, reference will be had to FIG. 2 in order to explain the controls of the bus control circuit 6 of each low-speed interface circuit board 3 for delivering or multiplexing the digital signal into the primary multiplexed signal on the bus line 1 of the corresponding data multiplexing bus, and for deriving or demultiplexing the digital signal from the primary multiplexed signal on the bus line 1.

In FIG. 2, symbol "CLK" denotes a clock which is synchronous to the bus line 1 or 2 of the data multiplexing bus, symbol "FP" a frame pulse which indicates the head position of a frame on the bus line 1 or 2, and symbol "DATA" the primary multiplexed signal on the bus line 1 or 2. Symbols "BUSCNT1"–"BUSCNT7" denote control signals which designate the timings of seven time slots allocated to the seven low-speed interface circuit boards 3 differing from one another, respectively. The bus control circuits 6 of the seven low-speed interface circuit boards 3 to which the corresponding time slots are allocated, generate the control signals BUSCNT1–BUSCNT7 in accordance with the settings thereof, respectively. Incidentally, the settings can be altered with ease.

The low-speed interface circuit board 3 to which the time slot corresponding to the control signal BUSCNT1 is allocated, controls the bus buffer 7 at the timing designated by this control signal BUSCNT1 and supplies the bus line 1 of the data multiplexing bus with the signal from the low-speed interface circuit 5.

On the other hand, the low-speed interface circuit 5 of the low-speed interface circuit board 3 to which the time slot corresponding to the control signal BUSCNT1 is allocated accepts the signal from on the bus line 2 of the data multiplexing bus at the timing designated by the control signal BUSCNT1. By the way, each low-speed interface circuit board 3 may well supply the signal to the bus line 1 and accept the signal from the bus line 2 at timings different from each other. In this case, two control signals BUSCNT's at the different timings are generated so as to be respectively used for the signal supply and the signal acceptance.

Meanwhile, in the first embodiment, each low-speed interface circuit board 3 accommodates first-rate-level transmission circuits of 1.544 [Mb/s] (DS-1: digital signal level 1) in the number of 4.

Figures 3A, 3B, 3C:
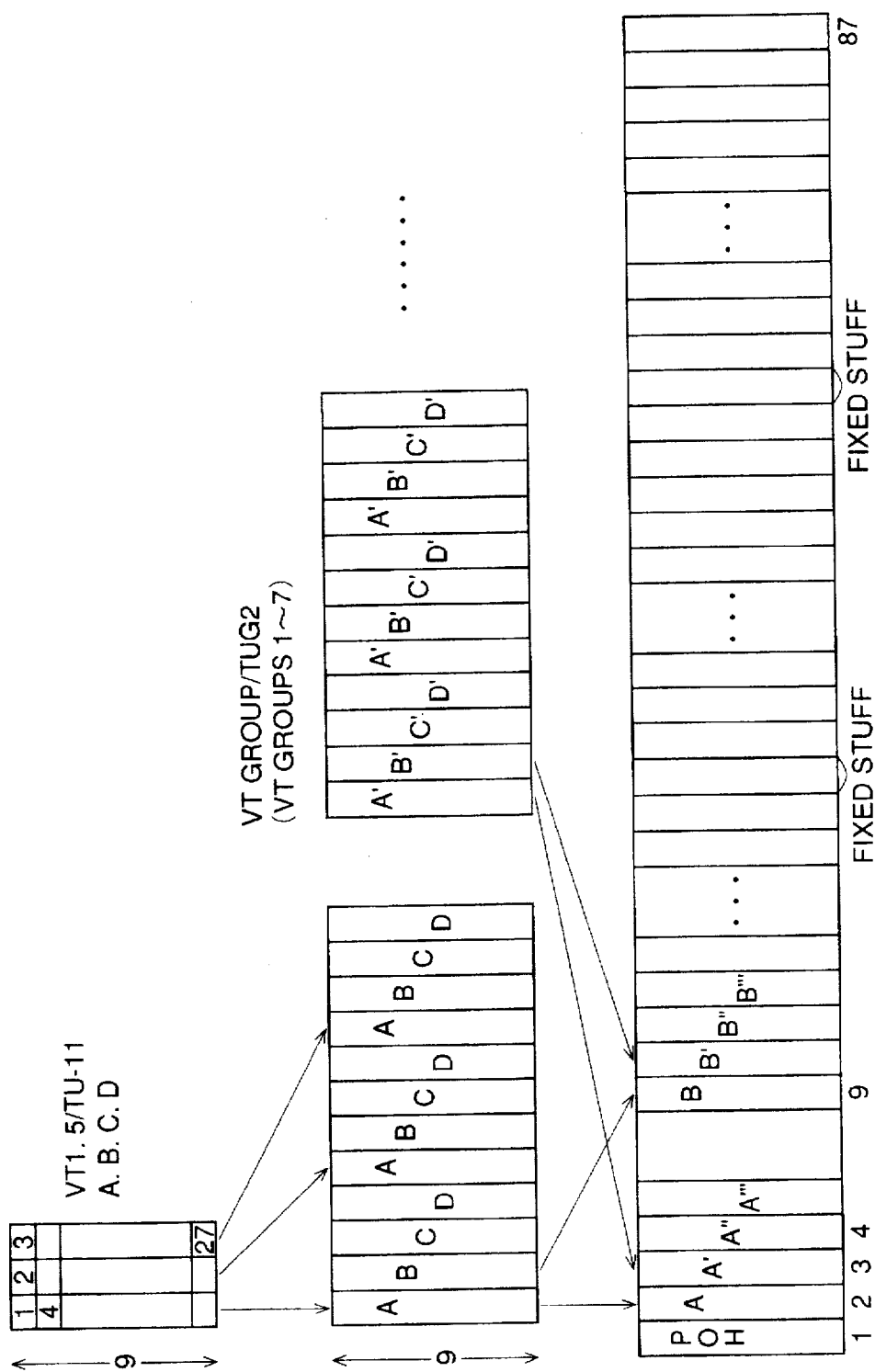
FIGS. 3A, 3B and 3C are explanatory diagrams showing the formats of frames which are utilized in the data multiplexing system of the first embodiment.

The low-speed interface circuit 5 of each low-speed interface circuit board 3 stores the signals of each circuit in a "VT1.5/TU-11" frame shown in FIG. 3A, and multiplexes such frames for the four circuits so as to form a "VT Group/TUG2" frame shown in FIG. 3B. Incidentally, one compartment of the "VT1.5/TU-11" frame in FIG. 3A expresses one octet.

Seven "VT Group/TUG2" frames delivered from the seven low-speed interface circuit boards 3 are multiplexed as shown in FIG. 3C on the bus line 1 or 2 of the data multiplexing bus, so as to form a "STS-1/STM-0" frame of 51.84 [Mb/s].

The multiplexer/demultiplexer 4 performs data multiplexing or demultiplexing on the basis of the synchronous octet multiplexing between the "STS-1/STM-0" frames on the plurality of connected bus lines 1 or 2 and an "STS-N" frame of N×51.84 [Mb/s] obtained by multiplexing N "STS-1/STM-0" frames.

Figure 4:
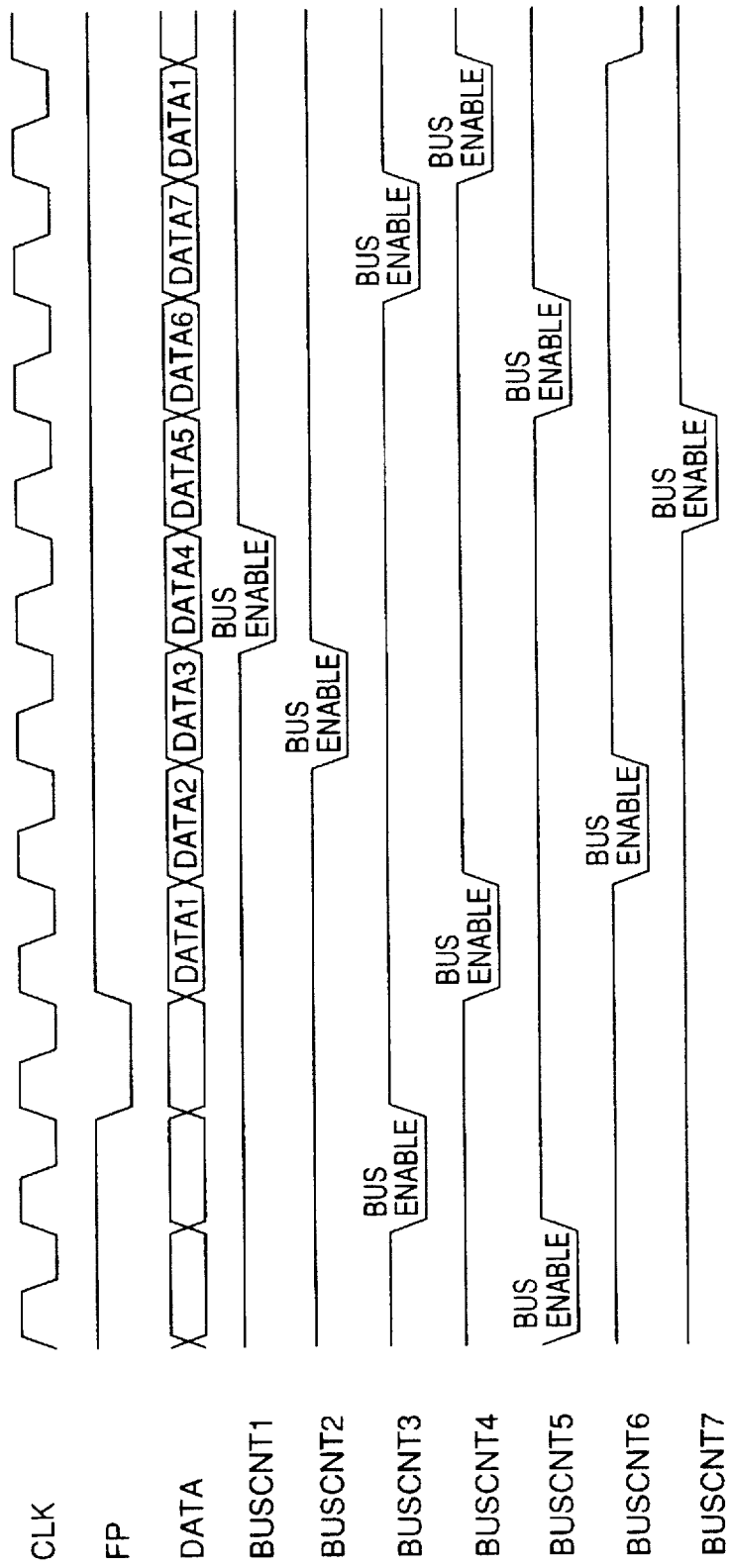
FIG. 4 is a timing chart showing another example of the operation of the data multiplexing system of the first embodiment.

Herein, the relationships between the seven low-speed interface circuit boards 3 and those time slots on the bus lines 1, 2 which are allocated to these circuit boards 3 can be altered and set at will as illustrated in FIG. 4.

It is also possible to allocate a plurality of time slots, in other words, a plurality of "VT Group/TUG2" frames to one low-speed interface circuit board 3.

Accordingly, the low-speed interface circuit boards 3 of different sorts in which the transmission lines of DS-1 (1.544 [Mb/s]), DS-2 (6.312 [Mb/s]), DS-3 (44.736 [Mb/s]), OC-1 (51.84 [Mb/s]), etc. are connected can be connected to the bus lines 1 and 2 of the identical channel and be operated as desired, within limits in which the total circuit capacity of all the low-speed interface circuit boards 3 associated with the bus lines 1 and 2 of the single data multiplexing bus is not exceeded on the side of the low-speed transmission lines 8. By the way, the method of the data multiplexing onto the bus line 1 of the data multiplexing bus as explained with reference to FIGS. 3A–3C before matches with the provisions of data multiplexing into the "STS-1/STM-0" frames of the digital signal levels DS-1 (1.544 [Mb/s]), DS-2 (6.312 [Mb/s]), DS-3 (44.736 [Mb/s]) and OC-1 (51.84 [Mb/s]) (which employs optical fiber) in the SONET.

Now, the second embodiment of the data multiplexing system according to the present invention will be described.

Figure 5:
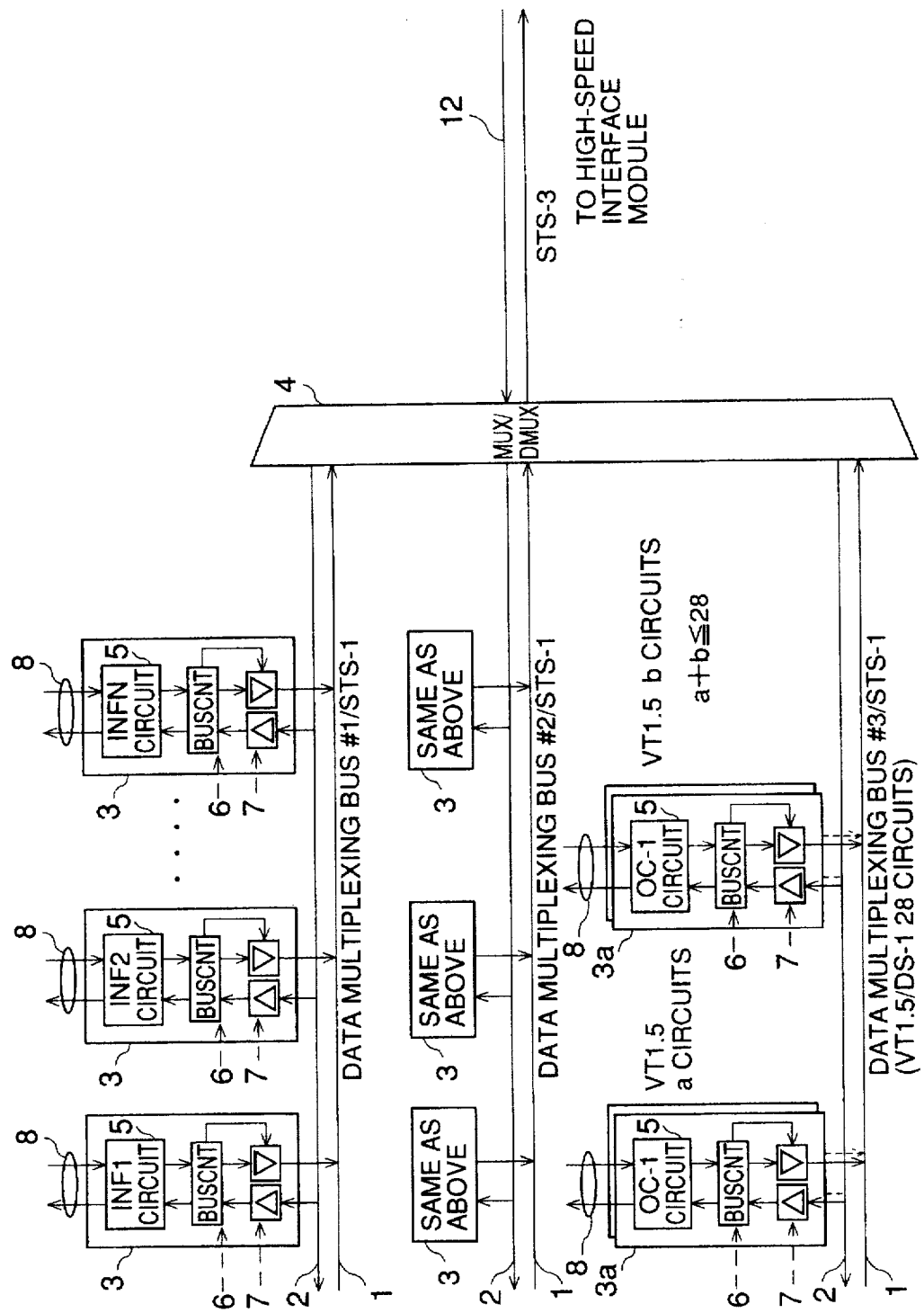
FIG. 5 is a block diagram showing the architecture of a data multiplexing system according to the second embodiment of the present invention.

FIG. 5 illustrates the architecture of the data multiplexing system of the second embodiment.

As shown in the figure, the second embodiment employs the bus lines 1, 2 of data multiplexing buses #1–#3 at the STS-1 level stated before, and it connects to the data multiplexing bus #3 a plurality of low-speed interface circuit boards 3a in each of which one channel at the level OC-1 (51.84 [Mb/s]) is connected.

Usually, the bus line 1 or 2 of the data multiplexing bus becomes filled up with one OC-1 channel. Here in the second embodiment, however, 28 "VT1.5/TU-11" frames constituting the "STS-1" frame are divided and are assigned to the OC-1 channels, each of which is allowed to transmit only the amount of data corresponding to the assigned number of "VT1.5/TU-11" frames. Thus, it becomes possible to realize the fiber extension function in which a circuit is extended for data transmission by optical fiber.

In the case of FIG. 5, the two low-speed interface circuit boards 3a (circuit boards #1 and #2) each accommodating one OC-1 (51.84 [Mb/s]) channel are mounted. Among the signals of the STS-1 level constituted by the "VT1.5 (DS-1)" frames of 28 circuits, a circuits are assigned to one of the circuit boards #1 and #2, and b circuits are assigned to the other (where a+b≦28 holds).

Figure 6:
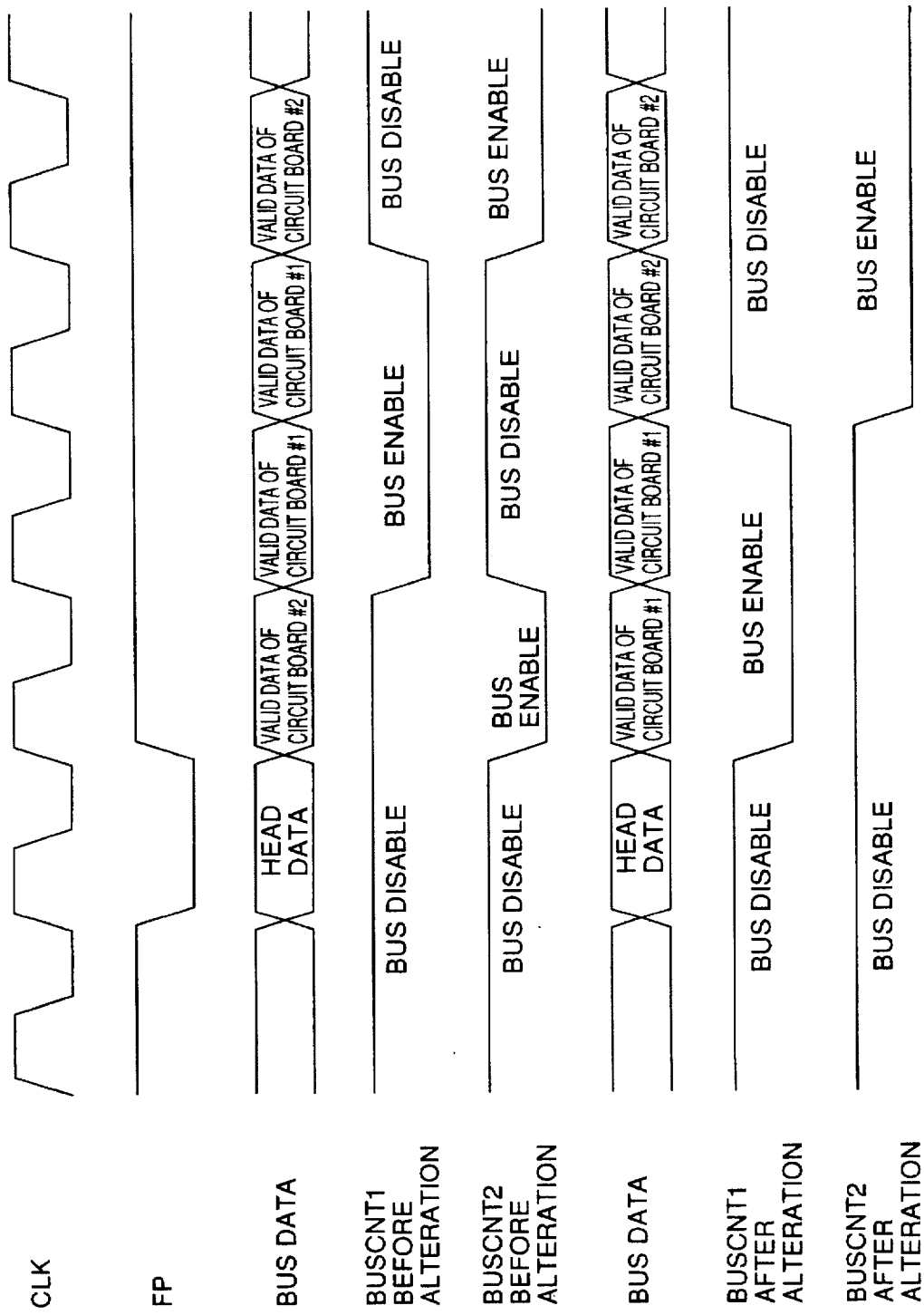
FIG. 6 is a timing chart showing an example of the operation of the data multiplexing system of the second embodiment.

The numbers of the assignments, and the "VT1.5 (DS-1)" frames to be assigned can be optionally set merely by altering the timings of control signals BUSCNT's from the respectively corresponding bus control circuits 6 of the circuit boards #1 and #2 as illustrated in FIG. 6.

By the way, the interface circuit board 3a for accommodating one OC-1 channel should preferably have a duplex configuration.

In this manner, according to the second embodiment, the "STS-1" frame can be distributed every desired number of "VT1.5 (DS-1)" frames, which can be directly relayed to different spots by the use of the optical fiber.

Now, the third embodiment of the data multiplexing system according to the present invention will be described.

Figure 7:
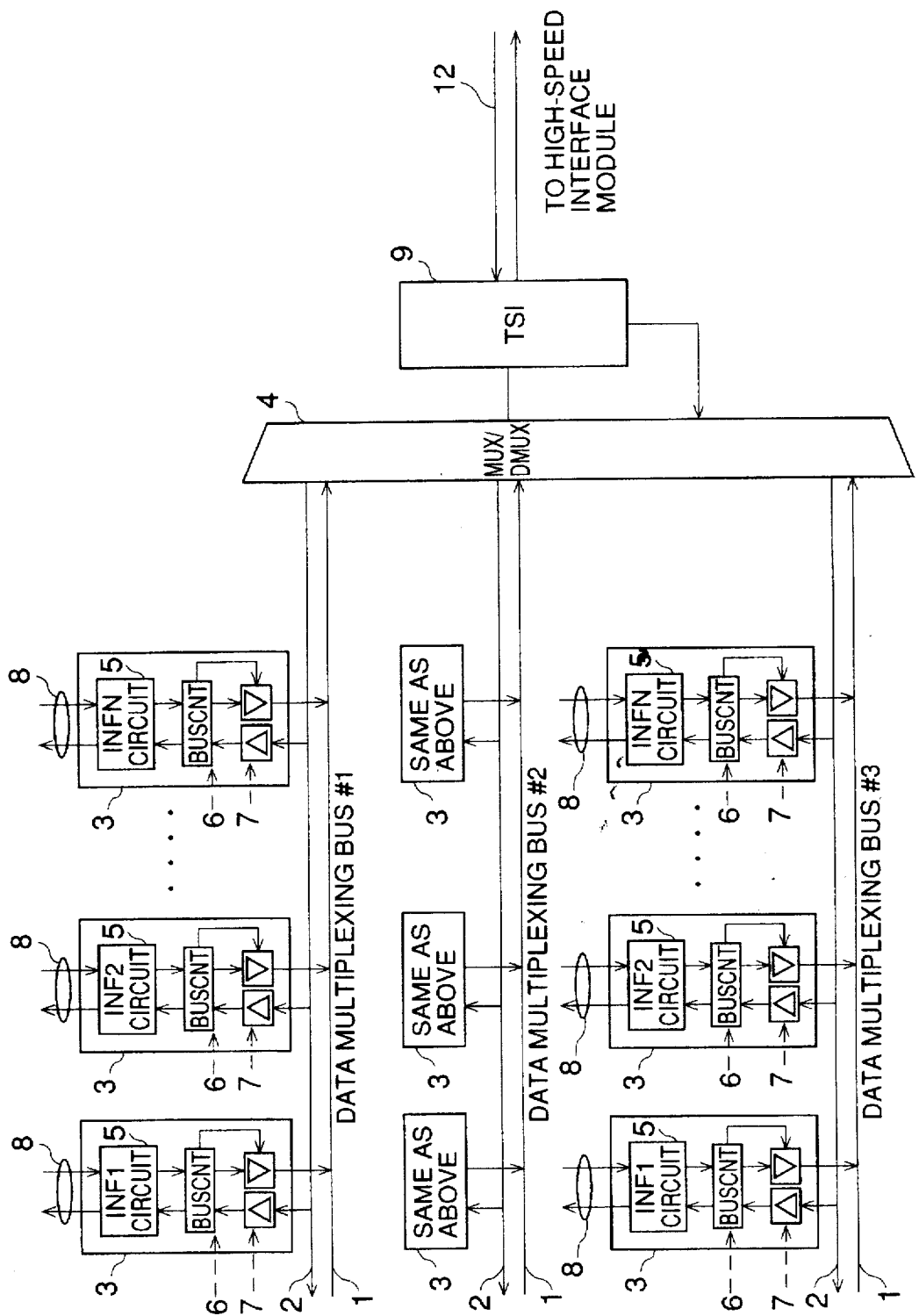
FIG. 7 is a block diagram showing the architecture of a data multiplexing system according to the third embodiment of the present invention.

FIG. 7 illustrates the architecture of the data multiplexing system of the third embodiment.

As shown in the figure, the data multiplexing system of the third embodiment is such that a time slot interchange module 9 (TSI) for interchanging time slots is added to the data multiplexing system of the first embodiment.

In a data multiplexing system of the branch/insertion type which uses only allocated time slots on a high-speed transmission line, all circuits are not usually branched or inserted. Accordingly, unused time slots arise.

In this embodiment, therefore, the unused time slots are utilized to connect the low-speed interface circuit boards 3 and to realize the function (hairpin connection function) of setting a circuit between the low-speed transmission lines 8 connected to the data multiplexing system.

More specifically, that one of the low-speed interface circuit boards 3 which is supplied with the low-speed digital signal to set the circuit multiplexes this signal into the primary multiplexed signal on the bus line 1 of the data multiplexing bus as stated before. The primary multiplexed signal is multiplexed by the high-speed multiplexer/demultiplexer 4 into the secondary multiplexed signal, which is delivered to the time slot interchange module 9. In the time slot interchange module 9, the low-speed digital signal to set the circuit as is contained in the delivered secondary multiplexed signal is put into the unused time slot corresponding to the circuit setting goal of the down primary multiplexed signal. Subsequently, the resulting secondary multiplexed signal is returned into the high-speed multiplexer/demultiplexer 4.

The returned signal is demultiplexed by the high-speed multiplexer/demultiplexer 4 into a plurality of primary multiplexed signals, which are respectively sent to the plurality of data multiplexing buses #1–#3.

The other low-speed interface circuit board 3 which is supplied with the low-speed digital signal to set the circuit, accepts the primary multiplexed signal on the data multiplexing bus in any desired time slot and sends the accepted signal to the connected low-speed transmission line 8 as stated before.

Figure 8:
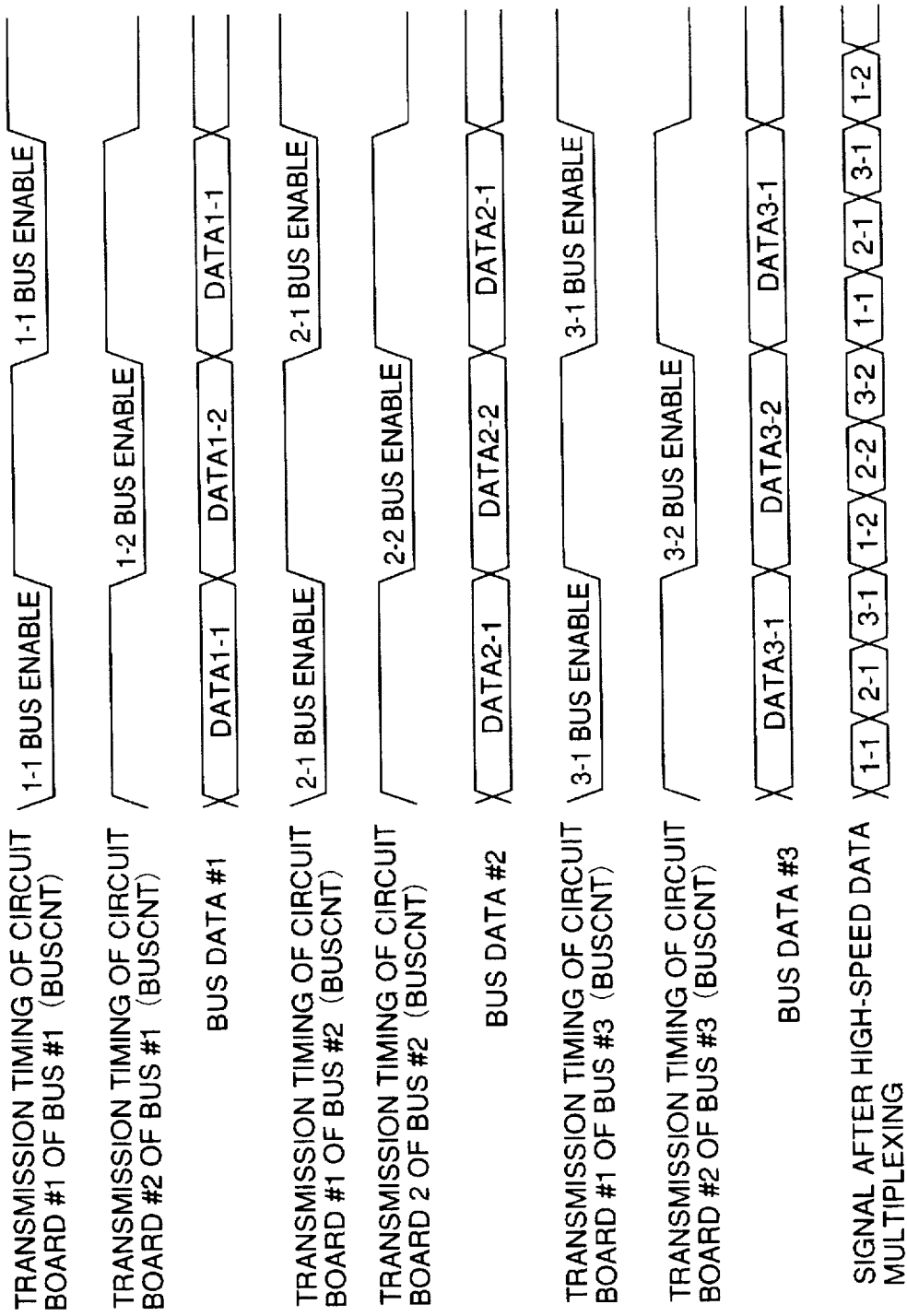
FIG. 8 is a timing chart showing an example of the transmitting side operation of the data multiplexing system of the third embodiment.
Figure 9:
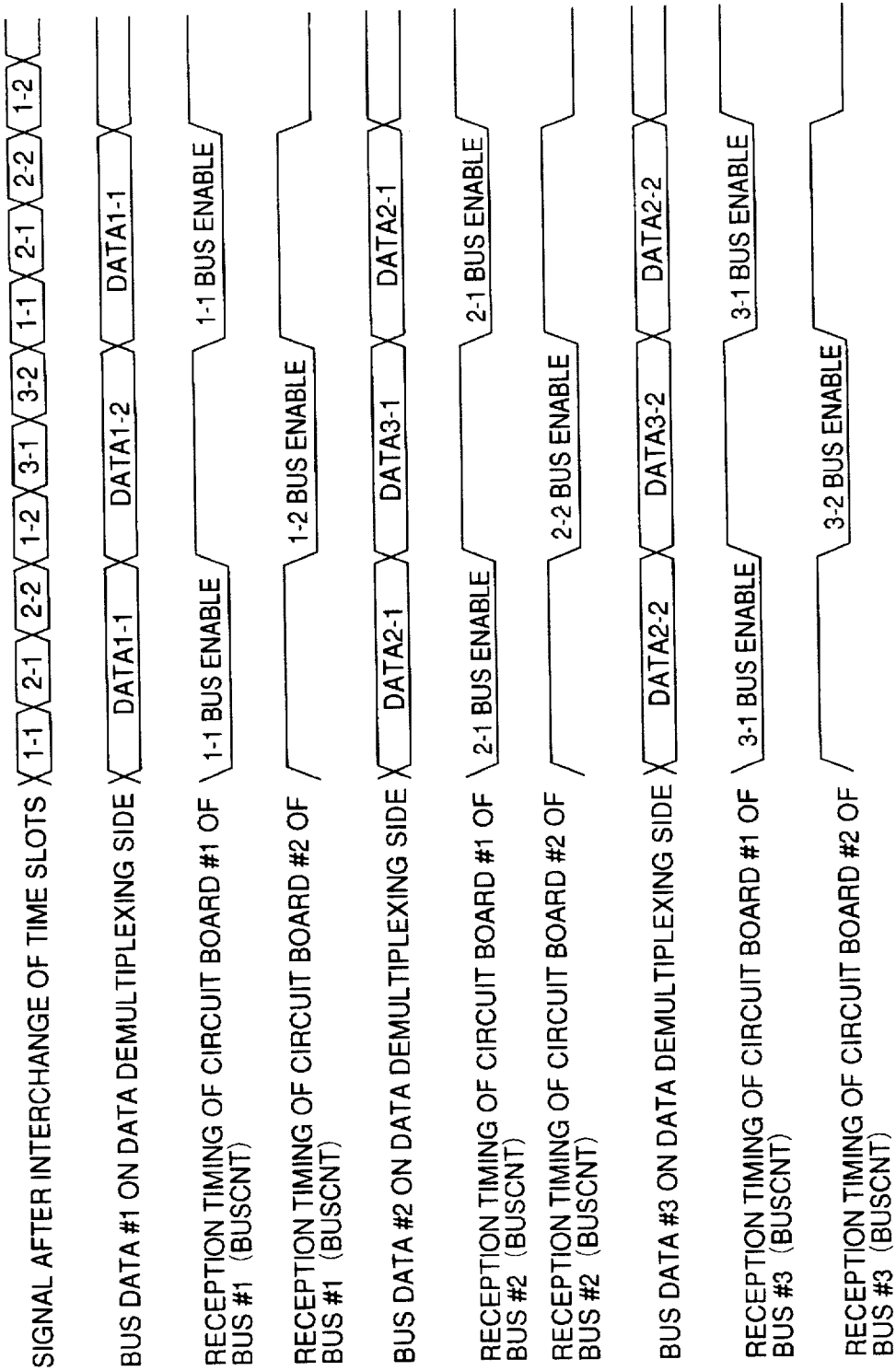
FIG. 9 is a timing chart showing an example of the receiving side operation of the data multiplexing system of the third embodiment.

FIGS. 8 and 9 illustrate the situations of the bus lines 1 and 2 of the data multiplexing buses in the third embodiment.

For the brevity of explanation, these figures are drawn assuming a case where the low-speed digital signals are duplexed on each of the bus lines 1 and 2. It is also assumed that the low-speed interface circuit boards 3 numbering two (circuit boards #1 and #2) are connected to each data multiplexing bus.

As shown in FIG. 8, data "DATA2-2" multiplexed onto the data multiplexing bus #2 (bus line 1) by the second low-speed interface circuit board 3 connected with this data multiplexing bus #2 (bus line 1) is multiplexed by the high-speed multiplexer/demultiplexer 4 into the secondary multiplexed signal, which is delivered to the time slot interchange module 9. As shown in FIG. 9, the time slot interchange module 9 puts the data "DATA2-2" contained in the delivered secondary multiplexed signal, into that time slot of the down primary multiplexed signal which corresponds to the first low-speed interface circuit board 3 connected with the data multiplexing bus #3 (bus line 2). Subsequently, the interchange module 9 returns the resulting signal into the high-speed multiplexer/demultiplexer 4.

The returned signal is demultiplexed by the high-speed multiplexer/demultiplexer 4 into the plurality of primary multiplexed signals, which are respectively sent to the plurality of data multiplexing buses #1, #2 and #3. Since the data "DATA2-2" is held in the time slot corresponding to the first low-speed interface circuit board 3 connected with the data multiplexing bus #3 (bus line 2), the primary multiplexed signal containing the data "DATA2-2" is sent to this data multiplexing bus #3 (bus line 2). Further, the data "DATA2-2" is sent in the time slot corresponding to the first low-speed interface circuit board 3 connected with the data multiplexing bus #3 (bus line 2). Accordingly, the data "DATA2-2" is accepted by the first low-speed interface circuit board 3 connected with the data multiplexing bus #3 (bus line 2)..

Likewise to the above, data "DATA3-1" which is sent by the first low-speed interface circuit board 3 connected with the data multiplexing bus #3 (bus line 2) is accepted by the second low-speed interface circuit board 3 connected with the data multiplexing bus #2 (bus line 1).

Data other than the data "DATA2-2" and "DATA3-1" are sent to the high-speed transmission line (11 in FIG. 1) in the same way as in the first embodiment.

Figure 10:
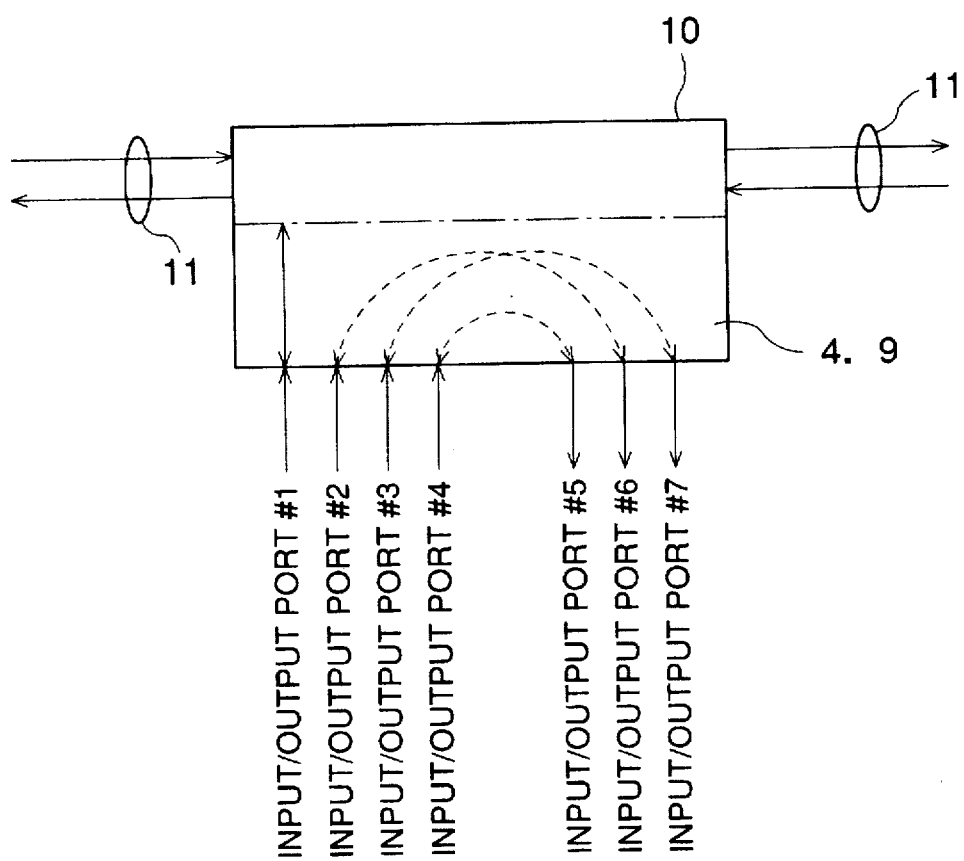
FIG. 10 is an explanatory diagram schematically showing the flows of signals in the data multiplexing system of the third embodiment.

Owing to such a hairpin connection, a circuit connection form as shown in FIG. 10 is permitted.

More specifically, it is now assumed that, among input/output ports #1–#7 through which the low-speed digital signals are to be sent to and from the data multiplexing system, those #2–#7 are idle ports corresponding to the time slots which become unused on the high-speed transmission lines 11. Then, the idle ports #2–#7 can be utilized for delivering the signals by folding the I/O port #2 to the I/O port #6, the I/O port #3 to the I/O port #7 and the I/O port #4 to the I/O port #5 as shown in the figure, respectively. The signal of the I/O port #1 is actually multiplexed and demultiplexed, and the resulting signals are supplied to and from the high-speed digital transmission lines 11. Incidentally, numerals 4, 8, 9 and 10 indicate the same parts as in FIG. 1.

In this manner, according to the third embodiment, the hairpin connection being the interconnection between the low-speed digital signals can be realized. Also in the data multiplexing system of termination type, the hairpin connection can be similarly realized by utilizing idle slots properly.

By the way, the assignments of the time slots on the bus lines 1, 2 of the data multiplexing buses to the respective low-speed interface circuit boards 3 can be set at will as explained in conjunction with FIG. 4 before.

Now, the fourth embodiment of the present invention will be described.

Figure 11:
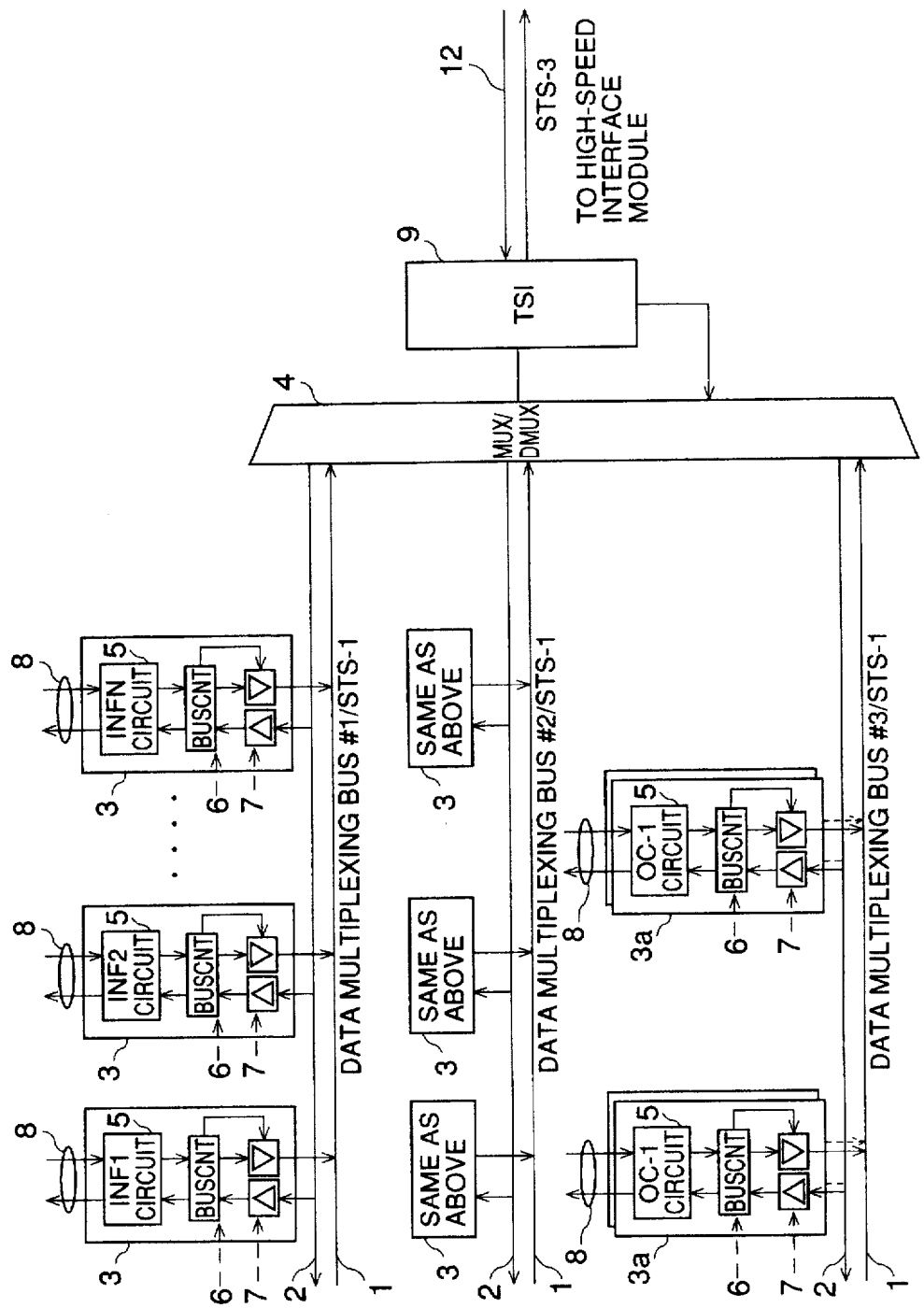
FIG. 11 is a block diagram showing the architecture of a data multiplexing system according to the fourth embodiment of the present invention.

FIG. 11 illustrates the architecture of the data multiplexing system of the fourth embodiment.

As shown in the figure, the fourth embodiment is such that the time slot interchange module 9 explained in the third embodiment is added to the data multiplexing system of the second embodiment described before.

The hairpin connection mentioned before is realized as follows: The signal having entered the low-speed interface circuit board 3 is multiplexed on the bus line 1 of the data multiplexing bus, and the resulting signal is further multiplexed by the high-speed multiplexer/demultiplexer 4. Thereafter, the signal of the multiplexer/demultiplexer 4 is subjected to the interchange by the time slot interchange module 9, and the resulting signal is returned to the bus line 2 of the predetermined data multiplexing bus. Subsequently, the low-speed interface circuit board 3 derives only the signal of the pertinent time slot from the bus line 2 of the data multiplexing bus and sends the derived signal through the transmission line 8.

By the way, any signal which does not undergo the direct circuit connection in the data multiplexing system is supplied to the high-speed interface module (10 in FIG. 1) and is sent to the high-speed transmission line (11 in FIG. 1).

Figure 12:
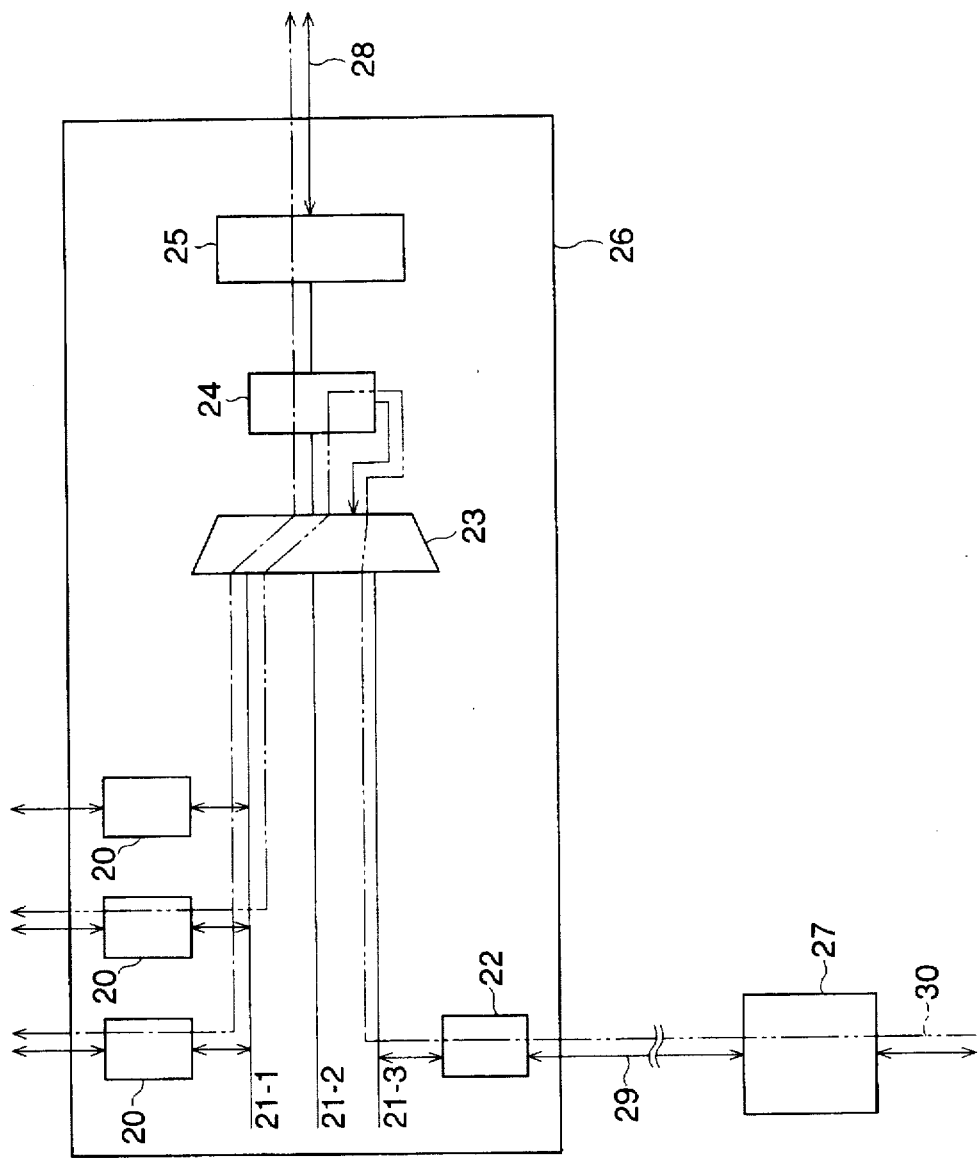
FIG. 12 is an explanatory diagram schematically showing the flows of signals in the data multiplexing system of the fourth embodiment.

Here, the flows of such signals are as schematically shown in FIG. 12.

Referring to FIG. 12, numeral 26 indicates the data multiplexing system of the fourth embodiment, numeral 27 a data multiplexing system included in another station, and numeral 30 the low-speed digital signals. Incidentally, the reverse flows of the signals are quite the same in principle. In this manner, according to the fourth embodiment, the signals can be exchanged or have their rates converted between any desired low-speed interfaces of different kinds.

Figure 13:
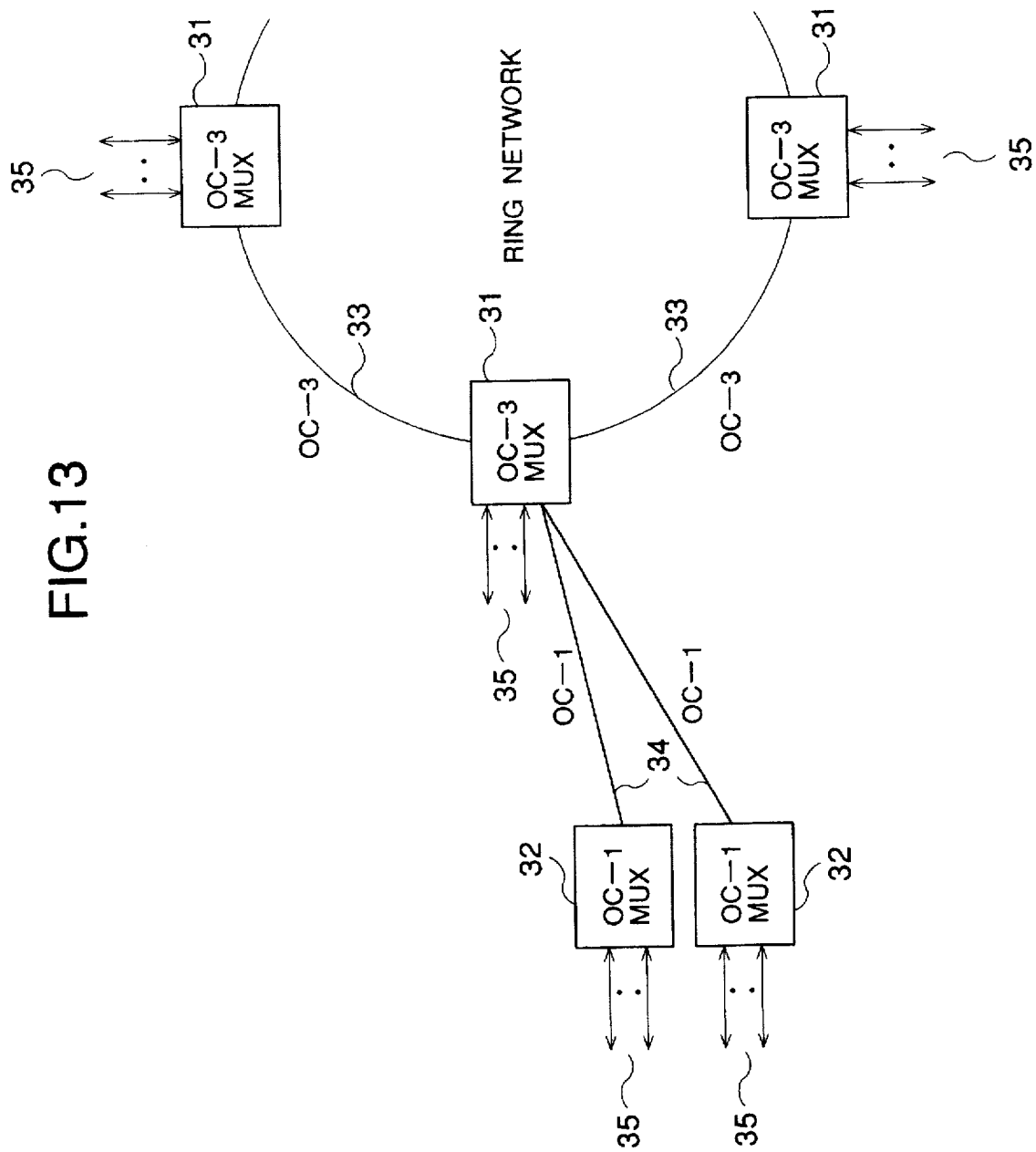
FIG. 13 is a block diagram showing the architecture of a network system which is constructed by the use of the data multiplexing system according to any of the embodiments of the present invention.

Meanwhile, a network shown in FIG. 13 can be built up by adopting the data multiplexing systems according to the first–fourth embodiments.

Referring to FIG. 13, numeral 31 indicates the data multiplexing systems #1, while numeral 32 indicates the data multiplexing systems #2. Numeral 33 represents high-speed transmission line signals, numeral 34 high-speed transmission line signals which are lower in the rate level than the signals 33, and numeral 35 low-speed digital signals. In such an architecture, the branch or insertion of the signal from or into one network or the exchange of the signals between networks is permitted by the data multiplexing systems of the first–fourth embodiments.

Figure 14:
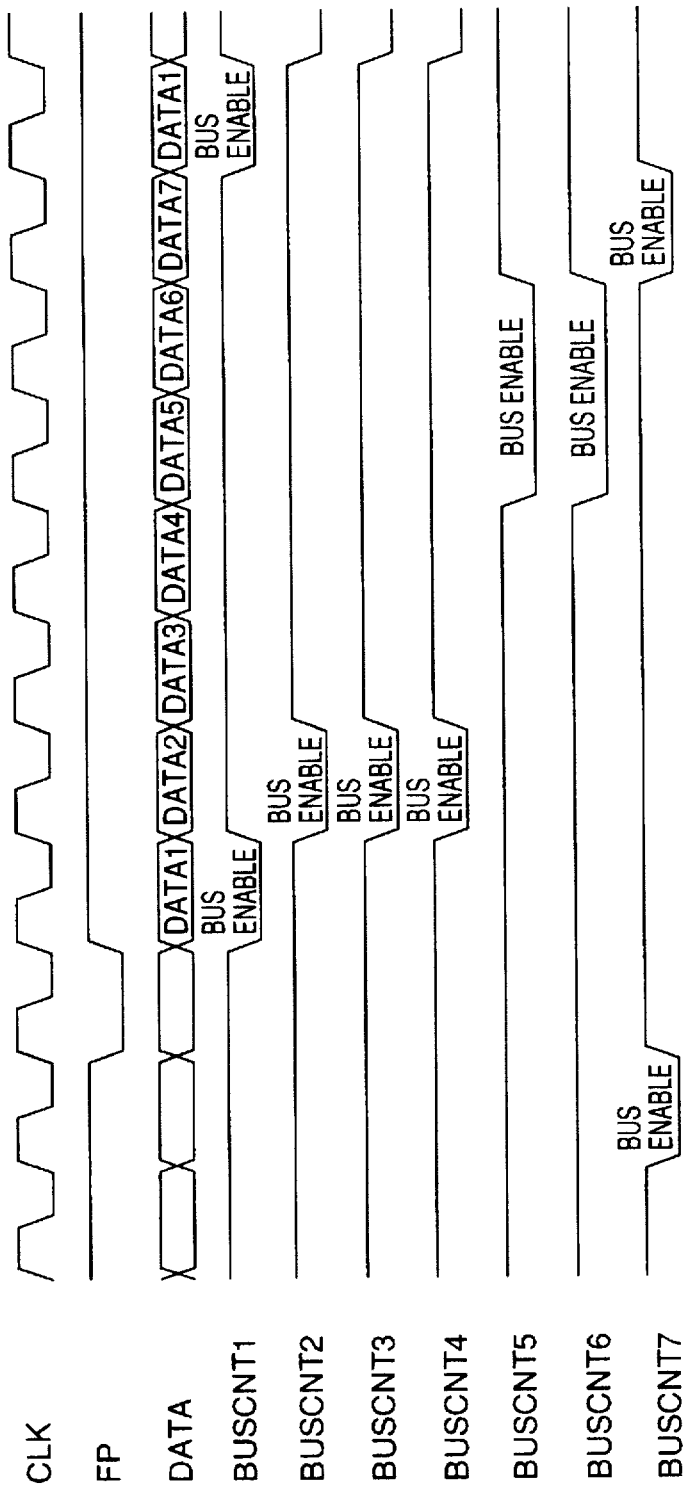
FIG. 14 is a timing chart showing the simultaneous communication operation of the data multiplexing system according to any of the embodiments of the present invention.
Figure 15:
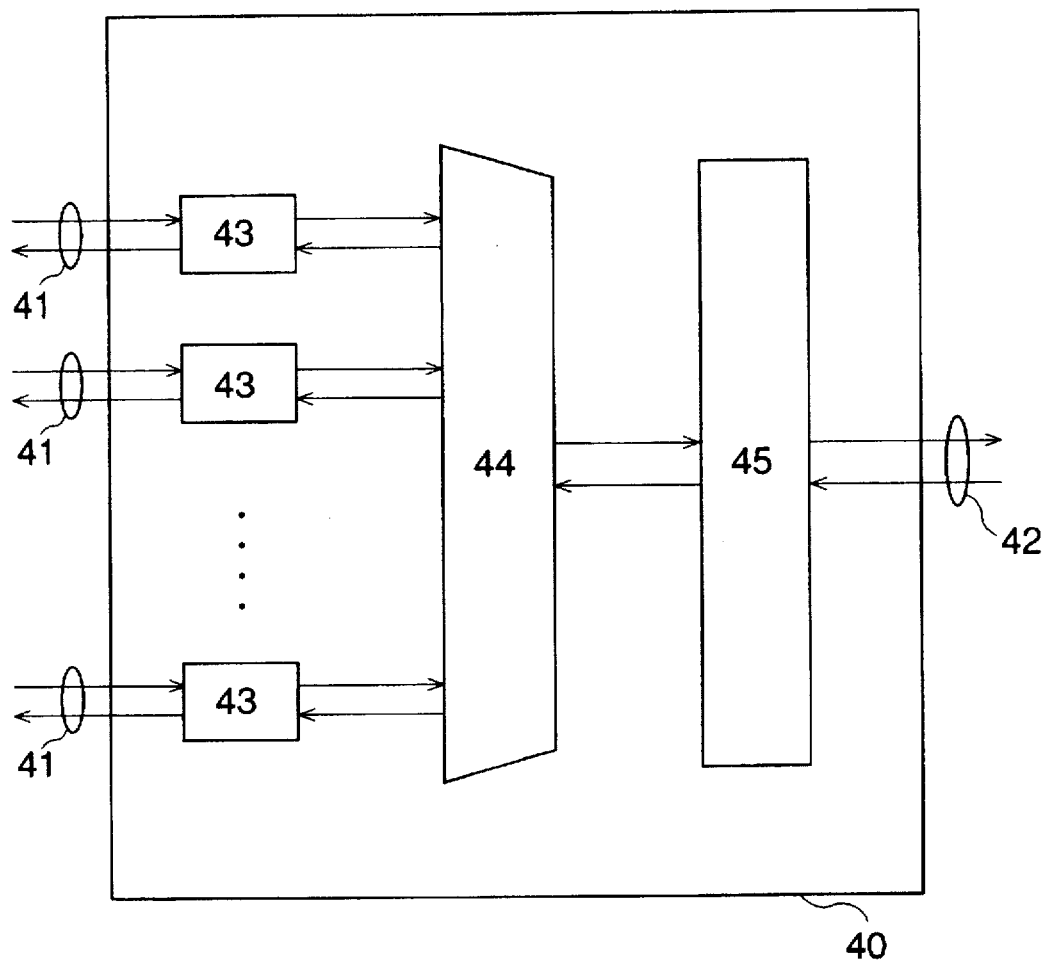
FIG. 15 is a block diagram showing the architecture of a data multiplexing system in the prior art.
Figure 16:
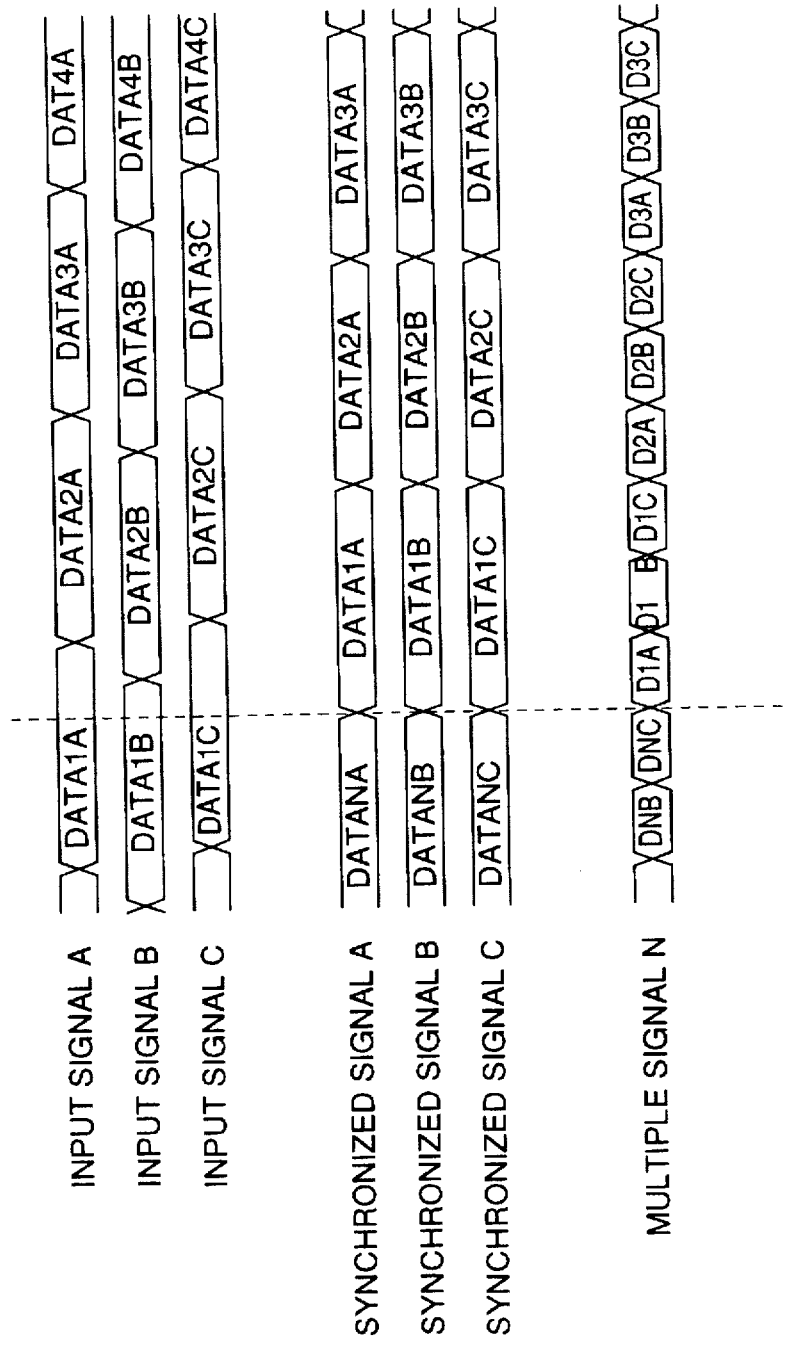
FIG. 16 is a timing chart showing the operation of the prior-art data multiplexing system.

In any of the first–fourth embodiments, when the reception side control signals BUSCNT's for the plurality of low-speed interface circuit boards 3 are set at the timings of the same time slots on the data multiplexing bus as illustrated in FIG. 14, the simultaneous communication of 1:N in which these low-speed interface circuit boards 3 receive the same signals can be realized.

Here, the number N can be optionally set within the maximum number of the low-speed interface circuit boards 3 connected to one bus line 2 of the data multiplexing bus.

It is also possible to realize a plurality of simultaneous communications of, for example, 1:N' and 1:N". The numbers N' and N" can be optionally set under the condition that the total number (N'+N") is within the maximum number of the low-speed interface circuit boards 3 connected to one bus line 2 of the data multiplexing bus.

In the case of FIG. 14, a group which consists of the three low-speed interface circuit boards 3 corresponding to the control signals BUSCNT2, BUSCNT3 and BUSCNT4, and a group which consists of the two low-speed interface circuit boards 3 corresponding to the control signals BUSCNT5 and BUSCNT6 receive the same signals, respectively.

As thus far described, according to any of the embodiments, in multiplexing a plurality of low-speed digital signals, data multiplexing buses having the format of a multiplexed frame are employed, and the signals are multiplexed by allowing low-speed interface circuits to access any desired time slots on the data multiplexing buses. On the other hand, in demultiplexing signals, controls are performed so as to derive only the predetermined signals on the data multiplexing buses. Accordingly, in the case of multiplexing and demultiplexing a plurality of kinds of digital signals, the low-speed interface circuit boards of different sorts can be readily replaced with each other at the identical mounting position of the data multiplexing system, and a flexible mounting form can be realized.

Moreover, the data multiplexing buses and a time slot interchange module are employed for interchanging time slots at a multiplexing rate level and thereafter sending the signals back in a demultiplexing direction, thereby making it possible to realize the interconnection between the low-speed digital signals, namely, the hairpin connection function or to realize the interface type conversion function of interconnecting low-speed digital interfaces of different sorts.

It is also possible to realize the function of simultaneous reception of 1:N, and the routing function of optionally distributing circuits on the data multiplexing bus to the low-speed digital signals whose circuit capacity is equal to or less than a circuit capacity allowed for the data multiplexing bus.

As described above, the present invention can provide a data multiplexing system which has a scheme adapted for a smaller size and which is capable of data multiplexing and demultiplexing of higher flexibility.

What is claimed is:

1. A data multiplexing/demultiplexing system for connection between a plurality of low-speed transmission lines for transmitting digital signals and a high-speed transmission line for transmitting digital signal frames having a plurality of time slots, comprising:

a plurality of low-speed interface circuits connected to said low-speed transmission lines, each including:

an interface through which said digital signals are input/output, a bus controller which controls timing of said digital signals to be input and output to and from an arbitrary time slot of said digital signal frames, and a buffer circuit which receives and outputs a digital signal from and to said digital signal frames;

a multiplex/demultiplex circuit comprising a plurality of multiplexing buses through which said plurality of low-speed interface circuits are connected with each other, and which multiplexes said plurality of digital signals in arbitrary time slots of said digital signal frames, and demultiplexes said digital signal frames to said plurality of digital signals; and a high-speed interface circuit which is connected to said multiplex/demultiplex circuit and which transmits/receives said digital signal frames to and from said high-speed transmission line.

2. A data multiplexing/demultiplexing system for connection between a plurality of low-speed transmission lines for transmitting digital signals and a high-speed transmission line for transmitting digital signal frames having a plurality of time slots, comprising:

a plurality of low-speed interface circuits connected to low-speed transmission lines, each including:

an interface through which said digital signals are input/output, a bus controller which controls timing of said digital signals to be input and output to and from an arbitrary time slot of said digital signal frames, and a buffer circuit which receives and outputs said digital signals to and from said digital signal frames;

a multiplex/demultiplex circuit comprising a plurality of multiplexing buses through which said plurality of low-speed interface circuits are connected with each other, and which multiplexes said plurality of digital signals in arbitrary time slots of said digital signal frames, and a high-speed interface circuit which is connected to said multiplex/demultiplex circuit and which transmits/receives said digital signal frames to and from said high-speed transmission line, wherein said digital signals of said plurality of low-speed transmission lines are multiplexed in the arbitrary time slots of said digital signal frames for transmission through said high-speed transmission line.

3. A data multiplexing/demultiplexing system for connection between a plurality of low-speed transmission lines for transmitting digital signals and a high-speed transmission line for transmitting a digital signal frame comprising a plurality of time slots, comprising:

a plurality of low-speed interface circuits connected to said low-speed transmission lines, each including:

an interface through which said digital signals are input/output, a bus controller which controls timing of said digital signals to be input and output to and from an arbitrary time slot of said digital signal frames, and a buffer circuit which receives and outputs said digital signals to and from said digital signal frames;

a multiplex/demultiplex circuit comprising a plurality of multiplexing buses through which said plurality of low-speed interface circuits are connected with each other, and which multiplexes said plurality of digital signals in arbitrary time slots of said digital signal frames and demultiplexes said digital signal frames to said plurality of digital signals;

a switch which is connected to said multiplex/demultiplex circuit and which interchanges the time slots of said digital signal frames; and a high-speed interface circuit which is connected to said switch and which transmits/receives said digital signal frames to and from said high-speed transmission line;

wherein the digital signals of said plurality of low-speed transmission lines are multiplexed in arbitrary time slots of said digital signal frames for transmission through said high-speed transmission line, and a digital signal in one of said low-speed transmission lines is transmitted to another low-speed transmission line.

\* \* \* \* \*